March 26, 1946.  C. R. HANNA ET AL  2,397,108
TRACER CONTROLLED POSITION FINDER
Filed Sept. 15, 1943  4 Sheets-Sheet 1

INVENTORS
Clinton R. Hanna and
William O. Osbon.
BY
Paul E. Friedemann
ATTORNEY

Fig. 3.

March 26, 1946.  C. R. HANNA ET AL  2,397,108
TRACER CONTROLLED POSITION FINDER
Filed Sept. 15, 1943   4 Sheets-Sheet 4

WITNESSES:

INVENTORS
Clinton R. Hanna and
William O. Osbon.
BY
Paul E. Friedemann
ATTORNEY

Patented Mar. 26, 1946

2,397,108

UNITED STATES PATENT OFFICE 2,397,108

TRACER CONTROLLED POSITION FINDER

Clinton R. Hanna and William O. Osbon, Pittsburgh, Pa., assignors to Westinghouse Electric Corporation, East Pittsburgh, Pa., a corporation of Pennsylvania Application September 15, 1943, Serial No. 502,488

24 Claims. (Cl. 90—13.7)

Our invention relates to a system of control for motors and, more particularly, to systems of control for a plurality of motors operating a machine doing work on a workpiece.

Our invention has utility in any machine tool operation where a workpiece is to be shaped in conformity with a pattern, but it has particular utility for the shaping and forming of a ship propeller in conformity with the shape of a small scale and relatively cheap model or pattern.

It is an outstanding object of our invention to rapidly, cheaply and above all, accurately automatically form the contours of a workpiece in conformity with scale models.

Another object of our invention is to provide a machine tool tracer and tracer and tool regulator system which is compact, relatively simple, and yet highly accurate.

A still further object of our invention is the provision of a machine tool regulator and tracer that is responsive not only to changes in configuration of a pattern or model but is responsive substantially without hunting to the rate of change thereof, thus allowing a much higher order of precision in the movement of the forming tool on a workpiece.

Other objects and advantages will become more apparent from a study of the following specification and the accompanying drawings, in which:

Figure 1:
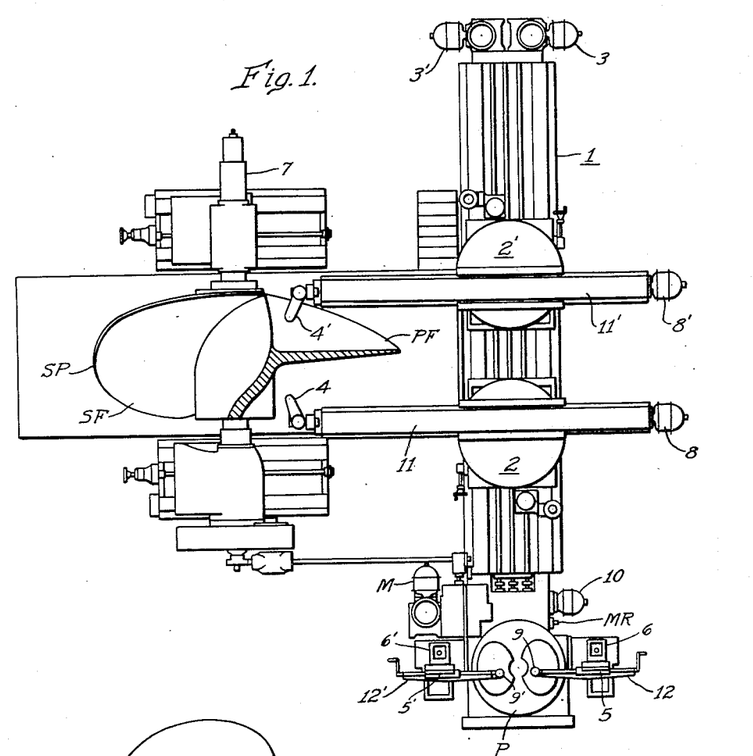
Figure 1 is a plan view of a ship propeller shaping machine provided with our system of regulation.
Figure 2:
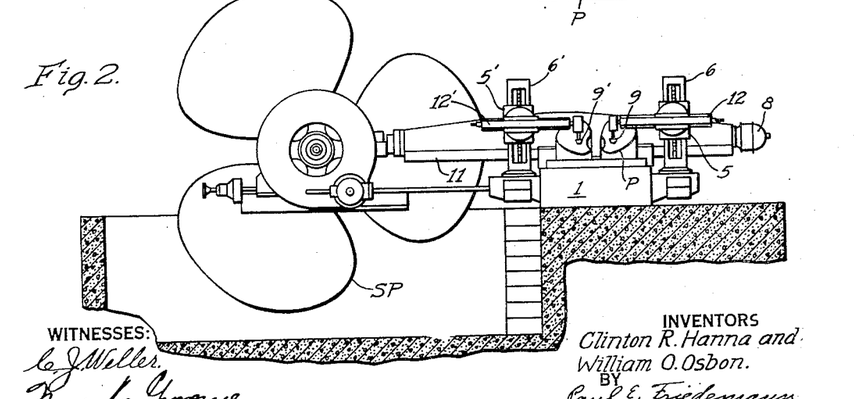
Fig. 2 is an end view of the machine shown in Fig. 1.

With the methods and apparatus of the prior art, the finishing of a screw propeller for a ship is a laborious time-consuming job, and frequently important ships are delayed for a considerable time while new screws are being made. The need for a machine that develops the contours of ship propellers accurately and quickly is thus apparent. The machine shown in Figs. 1 and 2 provides the mechanical elements for accomplishing such accurate and expeditious shaping of propellers provided the many motors needed to operate the various elements are properly controlled. Our systems of control provide such proper control.

The machine to which our control is applied is of the form following type, that is, one that reproduces the contour of a pattern or model in the metal of the propeller, or other workpiece. The machine provides for the machining of any contour on either side of the blade and the machining of any number of propellers with either right-hand or left-hand pitch from the same pattern. All blades on a given propeller are duplicates but differ in shape on the pressure face surface and the suction face surface. Only two patterns are thus needed, namely, one for each blade face, and the propeller is indexed for each succeeding blade.

The models or patterns are made of some relatively soft and easily formed material, such as plaster, wood or, where cost is no consideration, soft brass, or some other soft metal. The tracer control sensitivity and stiffness is sufficient to accurately control the follow-up operation of the saddle drive motor.

In this machine, two identical position regulators are needed—one normally being used to control the suction face saddle drive motor, and the other the pressure face saddle drive motor. In this showing, since our invention is complete without showing all of the complicated dual control for all the motors of the whole machine, only one position regulating control, namely, for the suction face saddle drive motor is shown.

The position regulator consists essentially of a variable voltage drive, with the exciter for the generator energized by a single stage direct current amplifier which derives its positioning stimulus from the tracer control. The control is entirely electrical and is such that the voltage of the generator supplying say the suction face saddle drive motor is varied from a maximum in one direction to a maximum in the other direction. The speed of the suction face saddle drive motor may thus be varied from 1000 R. P. M. forward to 1000 R. P. M. reverse without any loss of control in the region around zero speed. The tracer control is such that when the saddle and thus the cutter has followed each incremental movement of the tracer on the surface, then the portion of the excitation of the generator field due to the tracer deflection is substantially zero. In short, for each deflecting movement of the tracer, the saddle is caused to move so that the ultimate position of the tracer probes relative to the saddle is substantially unchanged.

The tracer and cutter saddles are both geared to the same motor. The gear ratio is, of course, different for the tracer saddle than for the cutter saddle since the model or pattern may be as small as one-fifth the size of the finished propeller.

The tracer control includes sensitivity control means, accelerating control means, antihunting control means and other features.

In Figs. 1 and 2, 1 designates the mount for the two cutter saddles 2 and 2'. These saddles are moved longitudinally along the mount by motors 3 and 3'. The saddles in addition to being longitudinally movable are also rotatably mounted about vertical axes for purposes of properly positioning and adjusting the cutters 4 and 4', with reference to the workpiece as a ship propeller SP, and for other purposes.

In order that the ship propeller may be cut and shaped in strict accordance with the contours of a pattern P, tracer saddles 5 and 5' are mounted for longitudinal movement on the columns or ways 6 and 6'. The saddles 5 and 5' also have adjustable rotary movement on axes normal to the columns. The columns 6 and 6' correspond in every respect to the two ways for saddles 2 and 2' on the bed 1. In fact, if desired, the ways 6 and 6' could be horizontal and the pattern P operated on a horizontal axis and not on a vertical axis, as shown.

The ship propeller is mounted on horizontal arbor 7 and is rotated by means of motor M and suitable reduction gears and control means not part of our invention, first in one direction through about 120° and then back through about 120°. The extent of the angular movement, of course, depends on the number of blades per propeller. For the cutting direction of rotation, that is, when the cutters 4 and 4' are operating on the propeller to shape it, the speed of operation is relatively slow and varied as a function of the load on the cutter motors 8 and 8'.

The pattern P is also geared to motor M and thus also rotates through about 120° back and forth while the propeller is moved through 120°. The angle of rotation will, of course, depend on the number of blades per propeller.

Since the pressure face PF of a propeller blade is different from the suction face SF, only two pattern surfaces are needed. These pattern surfaces need not, however, be on opposite sides of a model propeller or pattern, but may be cut differently on the top surface of some soft easily shaped pattern metal or pattern wood, and may be on a much smaller scale than the actual propeller. The gear ratios selected for the drive from the same motor M for the propeller and the pattern, respectively, take care of the proper operation of the propeller and pattern.

The sequence, once the machine is set up, very briefly stated is as follows: With the cutters 4 and 4' and the tracers or probes 9 and 9' assumed to be against the propeller SP and the pattern, respectively, ready for the first cut, the cutter motors 8 and 8' are set in operation, and then the motor M is caused to rotate the propeller and the pattern. This operation of motor M is relatively slow for the cut direction and is made a function of the load of the most heavily loaded cutter motor. As the cut begins, the tracers or probes traversing the pattern cause the operation of motors 3 and 3' to shift the follow-up members or saddles 2 and 2' and 5 and 5'. The tracers 9 and 9' are thus maintained against the pattern surfaces with a given pressure, and the cutters 4 and 4' maintain a substantially uniform cut on the propeller as it is rotated through one blade angle.

At the end of the cut stroke, the cutters 4 and 4' are moved away from the propeller SP, and the motor M is reversed and somewhat more rapidly returns the propeller and pattern to the initial position. Before a second cut is started, the ram feed motor 10 moves the rams 11 and 11' longitudinally to the new cutting position. Rams 12 and 12' are also geared to motor 10 and are thus moved longitudinally to a position to scan new traces on the patterns. The amount of feed is governed by a measuring relay MR.

The cutters are then again moved to cutting positions and a new cut is made. The cycles are then repeated until the propeller is properly shaped.

Figure 3:
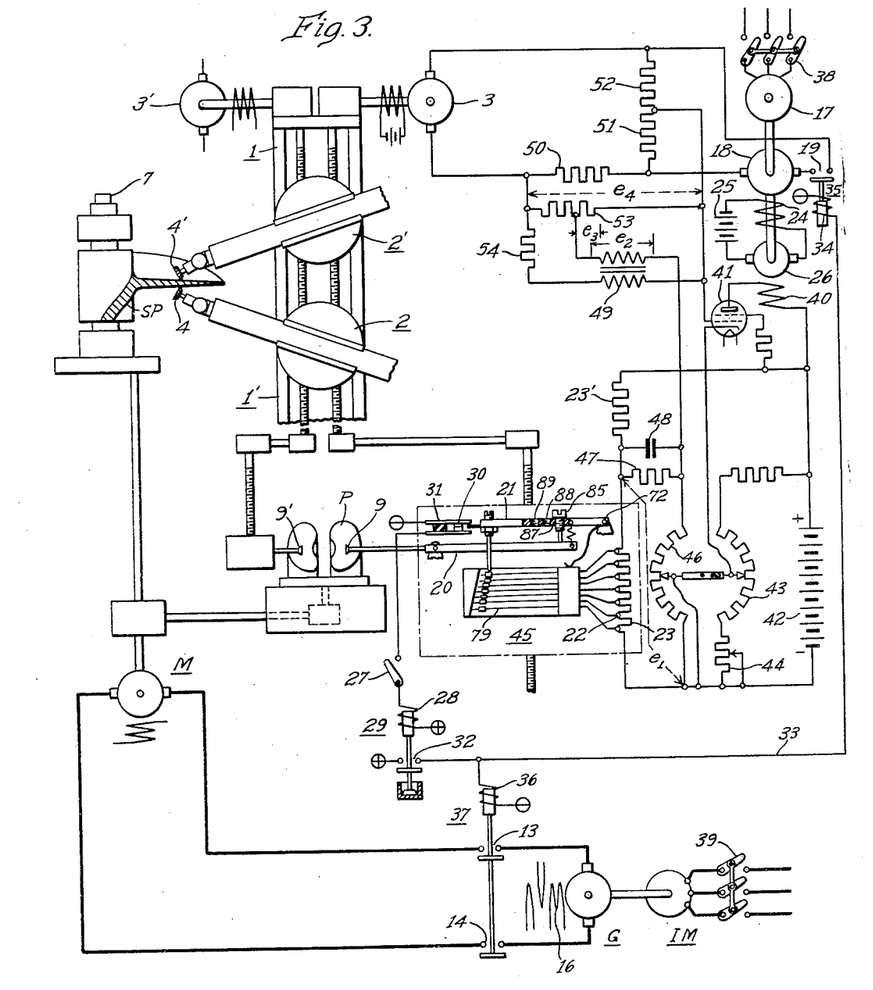
Fig. 3 is a schematic showing of the system of control as applied to the machine.

Referring more particularly to Fig. 3 showing the details of our invention, IM designates a constant speed induction motor for operating the generator G, which generator supplies energy to motor M through contacts 13 and 14 of contactor 37. The generator fields 16 are so controlled that motor M reciprocates the ship propeller SP back and forth through an angle determined by the number of blades per propeller. The arbor for the patterns is also geared to the motor M and reciprocates similarly to the reciprocation of the propeller. Since the reversing control is no part of our invention and since a detailed discussion of the position regulating system is complete when only short ranges of pattern and propeller movements in one direction are considered, the reversing control for the generator fields is not shown.

A second induction motor 17 drives the generator 18. This generator 18, when contact 19 is closed supplies energy to the saddle drive motor 3, for controlling the position of the saddle 2 and thus the suction face cutter 4. The tracer unit 45 is geared to the motor 3 and moves in proportion to the movements of the saddle 2. The probe 9 thus always holds the same corresponding position on the pattern P that the cutter 4 holds on the propeller SP, when lever arm 20 is in its neutral, or zero error, position—the position shown.

When the probe 9 is deflected by the pattern as it rotates, the lever system, including levers 20 and 21, is operated and more or fewer resistor sections 22 are shunted out by the spring contact members 79. It is this change in the effective resistance of rheostat 23 that controls, through a position regulation control system including an amplifier, the excitation of generator 18.

We are aware that others have provided means for controlling the speed and direction of operation of a motor as a function of the change in position of a probe relative to a neutral position, but it is a matter of extreme importance how accurately the cutters may be made to follow the indicated direction and extent of movement of the probe.

We have provided a position regulation system surpassing in accuracy and dependability any system heretofore proposed.

The excitation for this generator 18 is obtained from field winding 24. This field winding is connected in series with the constant voltage direct current source of supply, represented by battery 25, and the armature of the exciter 26. The battery voltage is so selected that it has a value equal substantially to the mean between the maximum and minimum exciter voltage and is so connected in the circuit to be in opposition to the exciter voltage. This means that if the exciter voltage is, say, 110 volts and the battery voltage is 110 volts, there will be no excitation of the field winding 24. Motor 3 will thus be at rest.

This condition of affairs obtains when both the probe 9 and the cutter 4 are in exactly corresponding positions on the pattern and propeller, respectively.

To establish normal operating conditions, the attendant closes switch 27 whereupon a circuit is established from the positive terminal shown through coil 28 of the time delay relay 29, switch 27, contacts 30 of the safety switch 31 to the negative terminal. The time delay relay may be of any suitable design having a delay in the opening of its contacts when its coil 28 is de-energized. No time constant of any appreciable value is needed when coil 28 is energized.

When the time delay relay 29 is energized and has operated, a circuit is established from the positive terminal through contacts 32, conductor 33, actuating coil 34 of line contactor 35 to the negative terminal. Another circuit is established through coil 36 of the line contactor 37 to the negative terminal. Operation of the two line contactors 35 and 37 connects the motors 3 and M to their respective generators 18 and G. The switches 38 and 39 are at this stage closed so that generators 18 and G are at full speed operation by the motors 17 and IM.

The motor 17 also operates the exciter 26 at full speed so that this exciter 26, in conjunction with the battery, or other source of constant direct-current voltage 25 connected in opposition to the exciter, energizes the field winding 24 in one or the other directions, depending on whether the exciter voltage is above or below the battery voltage.

The important feature is to properly control the excitation of field 40 of the exciter 26. This we accomplish through the control of the amplifying means including a plurality of tubes connected in parallel. Only one tube 41 is shown for purposes of clarity of the discussion. The excitation of field 40 is obtained from a constant source of relatively high direct current voltage 42. The energizing circuit for field 40 may be traced from source 42 through the field 40, the anode and cathode of tube 41, a portion of the bridging resistor 43, the adjustable resistor 44 back to the source.

Because of time delays inherent in the regulating system a stable regulator capable of only reasonable accuracy for moderate accelerations and speeds can be realized by applying to the amplifier just the positioning stimulus derived from the adjustable resistor 23 controlled by the tracer unit 45. In this simple low-accuracy regulator sustained oscillations would be prevented by the inherent damping of the armature circuit of motor 3. The maximum practical stiffness, and hence the accuracy, of such a system is restricted to relatively low values by fundamental design limitations on the ratio of motor circuit damping to system inertia and also by the time delays which have the effect of introducing phase shifts that reduce the effective damping of the system. Any attempt to increase the regulator stiffness to improve the accuracy would result in hunting. In the system illustrated in Fig. 3, there are three principal time delays; namely, the delay of the exciter field 40, the delay of the field 24 of the generator 18 and the delay of circuit including the generator 18 and motor 3. Consequently, in order to obtain a regulating system with adequate stiffness to insure high accuracy, and at the same time provide sufficient damping to insure rapid decay of free oscillations, it is necessary to introduce strong anti-hunting influences which will now be described.

Referring to Fig. 3, the voltage $e_1$ appearing across the sensitivity or stiffness adjusting rheostat 46 is derived from the resistor 22 and has an average value corresponding to the normal zero-error position of the tracer probe. At this normal operating point half of the resistor sections of rheostat 23 are shorted out. Resistor 23' and the steps of rheostat 23 are proportioned so that the voltage drop across the unshorted portion of rheostat 23 varies substantially linearly with probe displacement. Variations from the average voltage value, corresponding to displacement of the probe 9 from its zero-error position, can be considered as made up of two components. One of these is the drop due to the component of current which flows through resistor 47 and is proportional to the probe deviations or positional error. This component constitutes the positioning stimulus for the regulator. The other component is due to the part of the current which flows through the condenser 48. By making the resistance value of resistor 46 small compared to the resistance of 47, and by a proper choice of the capacity value of condenser 48, this component can be made proportional to the rate of change or first derivative of the probe deviation. It is well known that the inclusion in the input to a regulator of a stimulus proportional to the rate of change of the quantity being regulated exerts a powerful stabilizing effect. When the tracer probe 9 is deflected from its normal position, this component of voltage appears in its full magnitude even before the positioning stimulus appears. A large restoring force is thus produced which tends to correct for the error before it can attain its maximum value. For this reason, this component may be considered as anticipating the positioning voltage, and the circuit comprised of 46, 47 and 48 is, therefore, referred to as an anticipator circuit. Because it is not feasible to make 46 negligibly small compared to 47, the anticipator does not give perfect differentiation with the result that an additional small time delay acting upon the anticipator output is introduced into the regulating system. This effect is shown analytically hereinafter.

A further stabilizing voltage $e_2$ is obtained from the feedback transformer 49 connected into the generator-motor armature circuit. The bridge circuit consisting of resistors 50, 51, 52, and the motor armature resistance is balanced so that the voltage across resistor 53 is strictly proportional to the counter-E. M. F. of the motor and independent of load and accelerating currents. Since the counter-E. M. F. is proportional to speed, this voltage is thus proportional to the output velocity namely, the velocity of the follow-up members or saddles. The time constant of the primary circuit of the transformer, including the resistor 54, is made low so that the primary current is essentially in phase with the voltage across resistor 53 and the output velocity. The transformer secondary voltage $e_2$ is proportional to the rate of change of the primary current and hence is proportional to the output acceleration namely, the rate of change of velocity of the follow-up members. This voltage is applied to the amplifier input with a polarity such that the torque due to it opposes rapid acceleration of the drive motor and is consequently anti-hunting in its effect. Because it is not feasible to make the time constant of the transformer primary circuit negligibly small, the differentiation of velocity to obtain acceleration is not perfect and the consequence here also is the introduction of another small time delay acting in this case only upon the acceleration component of the amplifier input voltage.

With the regulator input voltages $e_1$ and $e_2$ described thus far, it is possible to increase the stiffness to a point where the positioning accuracy at very low speeds is more than adequate. However, when the drive motor 3 is running at some constant speed, the steady state excitation required by the main generator 18 must be produced entirely by the positioning voltage $e_1$. This means that when the motor 3 is running at top speed, the rheostat 23 must be adjusted by the probe 9 far enough from the mid-position to produce full excitation of the generator 18. In other words, a high output speed can be obtained only at the expense of a proportional displacement or error in the tracer probe position, and at top speed this error may be several times the normal acceleration error.

It is the function of the voltage $e_3$ to minimize these errors proportional to speed. This voltage being part of the drop across 53 is proportional to the output velocity and is applied to the amplifier input in series with $e_1$ and $e_2$ in such a direction as to tend to maintain the output velocity which produced it. Most of the main generator excitation required to produce the output speed is thus provided by $e_3$ relieving the adjustable resistor 23 of the major portion of this duty. By this means, the velocity error is reduced to a small fraction of what it would otherwise be. The portion of the velocity excitation provided by the adjustable resistor 23 is just sufficient to insure that the tracer unit retains control of the regulator. Instead of improving the stability of the regulator, however, the feedback for velocity error correction has exactly the opposite effect. Fortunately though, the reduction in overall damping of the regulator system is small and it is readily compensated for by a slight increase in the velocity component of the anticipator voltage $e_1$.

The use of vacuum tube amplifier 41 greatly simplifies the attainment of adequate anticipation, acceleration feedback, and velocity error correction with circuit components of small physical size and low power consumption. The almost infinite input impedance of amplifier 41 permits a wide flexibility in circuit arrangement and makes it possible to completely eliminate undesirable loading of the anticipator circuit by the feedback circuits and vice versa. A further advantage of the amplifier is that it permits the use of very low wattage resistor sections for resistor 23, making it feasible to mount these within the limited space inside the tracer unit housing thus avoiding a large number of electrical connections to the tracer unit 45.

Although only a single tube is indicated in Fig. 3, there are actually three tubes connected in parallel. This improves the reliability of the equipment since the regulators will still operate with somewhat greater error on only two tubes. The tubes, which are of a standard radio type obtainable in any radio shop, are very conservatively loaded so as to insure a long useful life.

The potentiometer, including resistors 43 and 44, in the cathode biasing circuit is ganged to the stiffness control resistor 46 for the purpose of compensating for the change in average drop across 46 as the stiffness of the regulating system is varied. This makes it possible to change the regulator stiffness without causing any disturbance in the system. Adjustable resistor 44 is used to adjust the regulator to the center of its range during the setting up process.

With our control the performance of the propeller milling machine as a whole is capable of greatly exceeding the specification requirements of 200 square inches of blade surface milled per hour. This is due both to the inherent cutting capacity of the machine and to the ability of the regulators to maintain a high degree of accuracy at speeds higher than needed. A practical cutting speed for face milling is of the order of 30 inches per minute, and at this speed the regulators hold the accuracy to better than $\pm.004$ inch at the work. During the high speed return stroke, the velocity reaches 100 inches per minute and the corresponding error is of the order of $\pm.012$ inch. There is no necessity for maintaining high accuracy during the return stroke, since in practice the cutters 4 and 4' are backed off from the work SP during this interval, so that the latter figure has no particular significance in the operation of the machine. It is indicative, however, of the capabilities of the regulators.

The rates of acceleration and deceleration at the ends of the strokes are limited to values of the order of 10 inches per minute per second and during these intervals the error is held to be well within the specification requirements of $\pm.020$ inch.

To further aid those skilled in the art to make, construct and compound our invention, reference may be had to the following analysis.

Referring to Fig. 3, the ratio of $e_1$ to the voltage of rheostat 23 in operational form is $$\frac{R_1}{R_1+\dfrac{R_2/C_p}{R_2+1/C_p}} = \frac{(1+T_ap)/(k_1+1)}{1+T_ap/(k_1+1)}$$

where $T_a=R_2C=$the anticipator time constant involving resistor 47 and condenser 48.
$k_1=R_2/R_1$, the ratio of the resistance values of resistors 47 and 46.
$p=$the differential operator $d/dt$.

It is apparent from this expression that the anticipator output contains two components, one proportional to the voltage of rheostat 23, and one proportional to the rate of change of this voltage. Both components are delayed, however, as indicated by the time delay operator $$[1+T_ap/(k_1+1)]$$

Any departure in $e_1$ from its average value is due to a displacement of the main saddle 2 from its correct position and results in a force on the saddle tending to reduce the displacement. The appearance of this force, however, is subject successively to the delays of the exciter field, the generator field, and the generator-motor armature circuit. The expression for the force due to $e_1$ in terms of the displacement $x$ is thus $$F_s=\frac{s(1+T_ap)x}{(1+T_1p)(1+T_2p)(1+T_3p)[1+T_ap/(k_1+1)]} \quad (1)$$

where the proportionality constant $s$ is the regulator stiffness, and $T_1$, $T_2$ and $T_3$ are respectively the three delays listed above. The regulator stiffness is defined as the force developed on the main saddle due to unit main saddle displacement.

The feedback transformer voltage may be written as $$c_2 = k_2 L p i = \frac{K_2 L p e_4}{R_7 + L p} = \frac{k_2 T_t p e_4}{1 + T_t p}$$

where $i$ is the primary current, $k_2$ is the transformer turns ratio, and $T_t$, the primary time constant, equals the ratio of primary inductance L to primary circuit resistance $R_7$. The voltage $e_2$ is thus proportional to the rate of change of $e_4$ and is delayed by the time lag of the transformer primary circuit. Since $e_4$ in turn is proportional to the output velocity or rate of change of displacement, $e_2$ is proportional to the second derivative of displacement or acceleration. The voltage $e_2$ also results in a force on the main saddle 2 which is likewise delayed by the times $T_1$, $T_2$ and $T_3$. Following the above reasoning, this force, which tends to reduce the acceleration, may be expressed in terms of the displacement $x$ as follows:

$$F_a = \frac{mp^2 x}{(1+T_1 p)(1+T_2 p)(1+T_3 p)(1+T_t p)} \quad (2)$$

where $m$ is the force per unit acceleration and has the dimensions of a mass.

In a similar manner the force due to the velocity error correction voltage $e_3$ may be written as $$F_v = \frac{-r_0 p x}{(1+T_1 p)(1+T_2 p)(1+T_3 p)} \quad (3)$$

where $r_0$ is the force per unit velocity having the dimensions of damping. The negative sign in (3) signifies that the damping is negative or that the force $F_v$ is tending to maintain the velocity $px$ rather than to reduce it.

The three forces acting on the saddle due to regulator action are opposed by the inertia of the mechanical system and the electrical damping of the generator-motor armature circuit. The appearance of the latter opposing force, however, is delayed by the armature circuit time delay $T_3$. Expressed algebraically the relationship is $$-Mp^2 x - \frac{rpx}{(1+T_3 p)} = F_s + F_a + F_v \quad (4)$$

where $r$ and $M$ are respectively the slope of the speed-force curve and the mass of the mechanical system, both referred to the saddle 2. Substitution of (1), (2), and (3) in this equation and reduction of the right-hand side to a common denominator give the following as the characteristic equation of the complete regulator system.

$$-Mp^2 - \frac{rp}{(1+T_3 p)} =$$

$$\frac{s(1+T_a p)(1+T_t p) + mp^2[1+T_a p/(k_1+1)] - r_0 p[1+T_a p/(k_1+1)](1+T_t p)}{(1+T_1 p)(1+T_2 p)(1+T_3 p)(1+T_t p)[1+T_a p/(k_1+1)]} \quad (5)$$

The constants M, $r$, $T_1$, $T_2$, and $T_3$ are fixed by the design of the rotating machines [1], and constants $s$, $r_0$, and $k_1$ are determined by the accuracy requirements of the regulator. The problem is then to determine values of $m$, $T_a$ and $T_t$ which will result in stable operation with a high rate of decay of free oscillations. A typical set of values follows:

[1] The mass of the saddle 2 is negligible compared to the equivalent mass of the drive motor 3.

*Machine constants*

$M = 1.2 \times 10^6$ lbs./ft./sec.$^2$
$r = 2.7 \times 10^6$ lbs./ft./sec.
$T_1 = 0.01$ sec.
$T_2 = 0.7$ sec.
$T_3 = 0.05$ sec.

*Accuracy constants*

$s = 60 \times 10^6$ lbs./ft.
$r_0 = 2.5 \times 10^6$ lbs./ft./sec.
$k_1 = 8$

*Stability constants*

$m = 10.8 \times 10^6$ lbs./ft./sec.$^2$
$T_a = 0.5$ sec.
$T_t = 0.02$ sec.

By substituting these values into (5), clearing of fractions, collecting terms, and dividing by the coefficient of $p^7$, the following equation is obtained:

$p^7 + 189.3\,p^6 + 11400\,p^5 + 268.5 \times 10^3 p^4 + 380.7 \times 10^4 p^3$
$314.6 \times 10^5 p^2 + 67.96 \times 10^6 p + 12.97 \times 10^7 = 0 \quad (6)$ The approximate factoring of this equation results in Equation 7.

$(p+16.2)(p+63.94)(p+95.0)(p^2+2.16p+5.58)$
$(p^2+12.04p+235.4) = 0 \quad (7)$

The three linear factors in (7) represent non-oscillatory motions of the saddle of the form $x = x_0 \xi^{p_1 t}$ where $p_1$ is the root of the appropriate factor. The quadratic factors of the form $p^2 + \beta p + \gamma$ correspond to oscillatory motions of the saddle which may be represented by the general equation $$x = \xi^{-\Delta t}(A \cos 2\pi ft + B \sin 2\pi ft)$$

where $f$ is the frequency of oscillation and $\Delta$ is the decrement. In terms of the trinomial coefficients $\beta$ and $\gamma$.

$$f = \frac{1}{2\pi}\sqrt{\gamma - \beta^2/4} \text{ and } \Delta = \beta/2$$

The fractional decay per cycle is given by $$\left(1 - \xi^{\frac{-\Delta}{f}}\right).$$

The oscillation frequencies obtained by this means from the two quadratic factors in (7) are 0.336 and 2.24 cycles per second, respectively, and the corresponding rates of decay are 96 percent per cycle and 93.1 percent per cycle. These rates of decay represent very high damping. If either of these figures were smaller (of the order of 60 percent or less) it would be necessary to change one or more of the stability constants listed previously and repeat the solution of the characteristic equation. If even the optimum values of the stability constants still yield too low a rate of decay, it may be necessary to reduce the regulator stiffness and accept the correspondingly lower accuracy.

The details of the tracer unit are illustrated in Figs. 4, 5, 6, 7, 8 and 9. There are, of course, two tracers but one showing of the details will suffice. The tracer units are mounted on the rams 12 and 12' and move in correspondence with the cutter rams 11 and 11'.

The tracer unit comprises a cylindrical steel case 61 within which a double lever system, a plurality of movable contacts, a safety switch, resistors, and associated elements are mounted.

The probe 9 has a shape that conforms to the contours, shape and size of the cutter with which it is to coact. By size it is, of course, to be understood that the ratio of pattern to propeller is taken into account. If, for instance, the pattern is half, or a fourth, the size of the propeller then the probe is only half, or one fourth, as the case may be of the size of the cutter.

Figure 4:
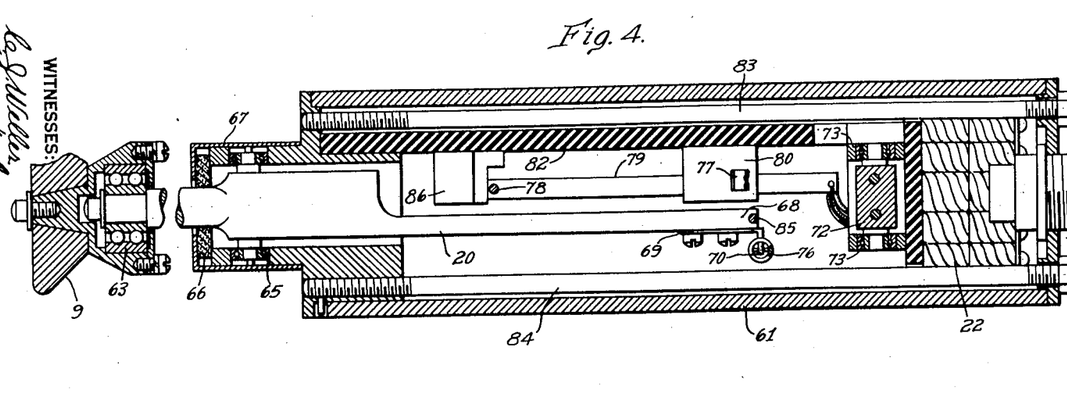
Fig. 4 is a longitudinal sectional view of the tracer unit.
Figure 5:
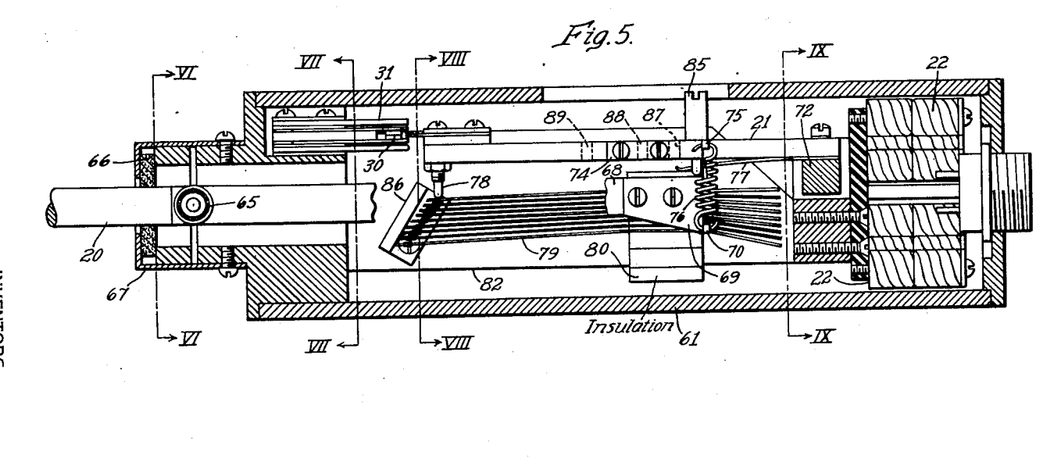
Fig. 5 is a second longitudinal sectional view, substantially normal to the sectional view of Fig. 4, of the tracer unit.
Figure 6:
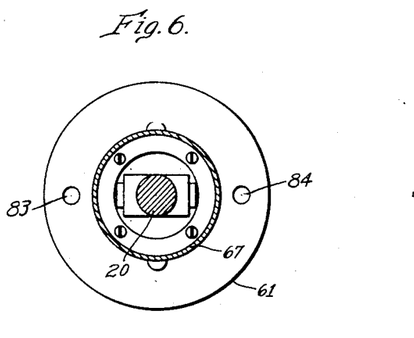
Figs. 6, 7, 8, and 9 are sectional views of the tracer unit taken on the lines VI—VI, VII—VII, VIII—VIII, and IX—IX of Fig. 5.
Figure 7:
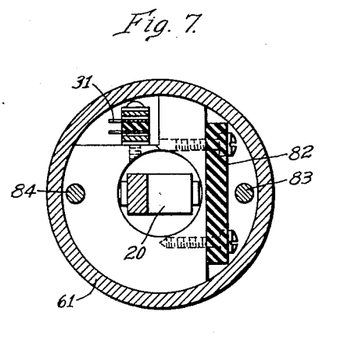
Figure 8:
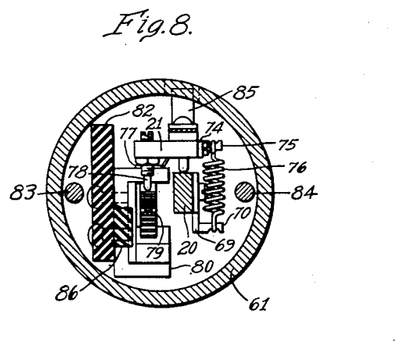
Figure 9:
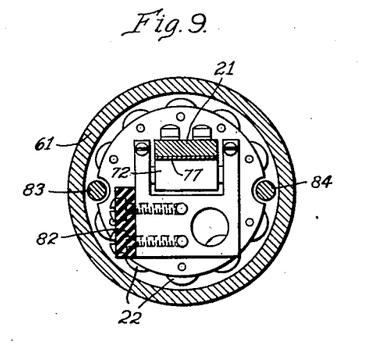

Referring to Figures 4 and 5, the probe 9 is mounted on anti-friction bearings 63 to thus be free to rotate about the longitudinal axis of the first lever 20 of the double lever system. The lever 20 is mounted for free rotary motion, through a limited angle, on ball bearings 65 mounted in races that are fixed in any suitable manner transverse to the case 61. The lever 20 fits snugly through stuffing washer 66 disposed for slidable movement between the cup-shaped cover 67 and the left hand reduced end of the casing 61. No dust and dirt can thus enter the casing to interfere with proper operation of the mechanisms within the casing.

Any given deflection of the probe 9 by the pattern from the normal, or neutral, position shown will cause a corresponding movement of the end 68 of the lever 20 within the case 61. The end 68 is provided with a plate 69 provided with a notched projection 70.

A second lever 21, mounted entirely within the case 61, is mounted on a block 72 which is rotatably mounted on ball bearings 73 for rotation about an axis parallel to the axis of rotation of lever 20. This lever 21 has a strap 74 mounted thereon, the strap being substantially in the plane of plate 69. The strap 74 is provided with a notched projection 75 normal to the strap and falling substantially in the plane of projection 70. A spring 76 under a predetermind tension is hooked into the notches of the projections 70 and 75 and this spring tends to pull the levers 20 and 21 toward each other. A leaf spring 77 of a selected design and under predetermined deflection with its free end resting on block 80 normally supports the weight of lever 21 against the pull of gravity.

The lever 21 has an adjustable pin 78 coacting with the spring type contact members 79 forming part of the electrical control. These spring contacts are insulated from each other and at the right (see Fig. 5) are rigidly mounted in an insulation block 80. The right hand ends are connected to the resistor sections 22.

The bearing for lever 21, the resistor sections 22, and the spring contacts 79 are all mounted, as a unit, on the L-shaped member 82. This arrangement has the advantage that all these elements, when the two bolts 83 and 84 are removed, may be withdrawn from the casing 61 as a unit. The assembly is also greatly facilitated by this construction.

Normally the adjustment of pin 78 for any position of pin 85, which depends on the ratio of the size of the pattern to the finished work-piece, is such that about half the spring contacts 79 are actuated away from the angularly disposed block 86 and thus make contact with each other when lever 20 is in its neutral, or zero, position, as shown.

The ratio of the lever system is adjustable so that the motion of the probe 9 required to produce full deflection of the spring contacts 79 can be made to correspond approximately to the ratio of the size of the model to that of the propeller being machined. This adjustment is obtained by means of pin 85. For the position of the pin 85 shown, the ratio of the size of the model to that of the propeller is one to five.

When the model is one fourth the size of the propeller, pin 85 is screwed into aperture 87. When the model is one third the size of the workpiece, the pin 85 is screwed into aperture 88 and when the model is half the size aperture 89 is used.

For the illustrated position of pin 85, a given movement of the probe 9 will produce substantially two and one half times the movement of pin 78 that is produced when pin 85 is in aperture 89.

This adjustment in the tracer sensitivity provides means for maintaining the stiffness of the regulator substantially constant as the model ratio is changed. In other words, when using a particular size of model the absolute magnitude of the error at the cutter is substantially independent of the model ratio, and a twenty-four foot propeller can be machined with no greater absolute error than a ten-foot propeller. Since this adjustment affects only the magnitude of the error and does not of itself determine the model ratio, it does not need to be continuous. Accordingly, the four positions of the ratio adjusting pin shown in Fig. 5, corresponding to model ratios of 2, 3, 4, and 5, provide adequate range.

The spring forces and the gravitational forces acting on the levers are so chosen that the maximum force on the probe need never exceed two pounds. Thus with probes of reasonable weight the force exerted on the model is sufficiently low to permit the use of even moderately soft materials such as plaster or soft wood.

In order to provide a safety feature for the machines a pair of contacts 30 are mounted within the case of the tracer unit. These contacts serve as a limit switch to shut down the machine when the lever 21 is deflected beyond its normal range. This feature protects the propeller blade, the tracer unit, and the machine from damage due to mechanical or electrical failures. The time delay relay 29 in the limit switch control circuit prevents shutdown during minor transient conditions which result in only moderately excessive accelerations. During these transients damage to the tracer is prevented by adequate overtravel in the lever system.

We, of course, aware that others, particularly after having had the benefit of the teachings of our invention, may devise other regulating control systems for controlling the position of a machine tool element. We, therefore, do not wish to be limited to the specific showings made in the drawings and the descriptive disclosure hereinbefore made, but we wish to be limited only by the scope of the claims hereto appended.

We claim as our invention:

1. In a system of control for a machine for automatically shaping a propeller, in combination, a main reversible motor for angularly reciprocating the propeller, a generator connected to energize the armature of said motor, a source of direct current for exciting the generator, propeller forming means, a forming motor operating the propeller forming means, a saddle motor for positioning the forming means relative to the propeller, a pattern, a tracer probe normally having a zero position on the pattern, control means responsive both to the departure and the rate of change of departure of the tracer probe from its zero position, energizing means for the saddle motor, said control means through the energizing means controlling the position of the forming means on the propeller to correspond in position on the propeller to the zero position of the tracer probe means on the pattern.

2. In a system of control for a machine for automatically shaping a propeller, in combination, a main reversible motor for angularly reciprocating the propeller, a generator connected to energize the armature of said motor, a source of direct current for exciting the generator, propeller forming means, a forming motor operating the propeller forming means, a saddle motor for positioning the forming means relative to the propeller, a pattern, a tracer probe normally having a zero position on the pattern, control means responsive both to the departure and the rate of change of departure of the tracer probe from its zero position, energizing means for the saddle motor, said control means through the energizing means controlling the position of the forming means on the propeller to correspond in position on the propeller to the zero position of the tracer probe means on the pattern, and means responsive to the said control means for modifying the excitation current of the generator.

3. In a position regulating system for a machine tool, in combination, a tool, means for moving said tool on a workpiece, a pattern, a tracer unit coacting with said pattern for controlling the movement of the tool, said tracer unit including variable resistance means, anticipating means connected in parallel with said variable resistance means, said anticipating means comprising an adjustable resistor, and a resistor and capacitor connected in parallel with each other and connected in series with said adjustable resistor, electronic amplifying means, and means responsive to the potential across said adjustable resistor and the rate of change of the potential across said adjustable resistor for controlling the operation of said electronic means, and means responsive to the operation of said electronic amplifying means for varying the operation of the means for moving said tool.

4. A machine tool tracer regulator comprising a tool, electric motor means for feeding said tool, a template, electric control means coacting with the template for controlling the means for feeding the tool, said electric control means including a resistor having multiple flexible shunt contacts for progressively shunting portions of said resistor, lever means operatively disposed between said contacts and template for progressively operating said contacts in accordance with the displacement of the lever means while coacting with the contour of said template, and means for altering the control effect of said electric control means responsive to the rate of change of displacement of said lever means with reference to a neutral position, and mechanical transmission means for mechanically coupling said template coacting means with said tool feeding means.

5. A machine tool tracer regulator comprising a tool, means for feeding said tool, a template, means coacting with the template for controlling the means for moving the tool, said last-named means including a resistor having multiple flexible shunt contacts for progressively shunting portions of said resistor, lever means between said contacts and template for progressively operating said contacts in accordance with the displacement of the lever means while coacting with the contour of said template, means responsive to the rate of change of displacement of said lever means with reference to a neutral position, and means responsive to the rate of change of said velocity of said lever means, and mechanical transmission means for mechanically coupling said template coacting means with said tool feeding means.

6. In a system of control for a machine tool for operating on a workpiece, in combination, a model workpiece, a tool for operating on a workpiece to be finished, a mechanical coupling, a tracer unit having a probe engaging the model but which probe is by means of said coupling mechanically coupled to the tool to move with the tool, said probe being positioned on the mechanical coupling to have some degree of movement with reference to the coupling, operating means for moving the tool over the workpiece and the probe, through the mechanical coupling, over the model workpiece, and electric control means including: means responsive to the displacement of the probe from a neutral position on the mechanical coupling for controlling the operation of said operating means to thus control the movement of said tool on the workpiece and said probe on the model workpiece, and means responsive to the velocity of movement of the probe with reference to the mechanical coupling for modifying the controlling effect of the means responsive to the displacement of the probe from said neutral position.

7. In a system of control for a machine tool for operating on a workpiece, in combination, a model workpiece, a tool for operating on a workpiece to be finished, a mechanical coupling, a tracer on the mechanical coupling engaging the model but by said coupling mechanically coupled to the tool to move with the tool, said tracer being positioned on the mechanical coupling to have some degree of movement with reference to the coupling, operating means for moving the tool, and electric control means including means responsive to the displacement of the tracer from a neutral position on the mechanical coupling, means responsive to the velocity of movement of the tracer from the neutral position on the mechanical coupling, and means responsive to the rate of change of velocity of the tracer for controlling the operating means to thus control the movement of the tool and tracer with reference to the workpiece and model workpiece, respectively.

8. In a system of control for a machine tool for operating on a workpiece, in combination, a model workpiece, a tool for operating on a workpiece to be finished, a mechanical coupling, a tracer unit including a probe engaging the model but said tracer, by said coupling being mechanically coupled to the tool to move with the tool, said probe being positioned on the mechanical coupling to have some degree of movement with reference to the coupling, operating means for moving the tool and tracer, electric control means for controlling the movement of the tool and tracer unit, said electric control means including, a lever system operated by the probe, a housing therefor, means for adjusting the lever arms to compensate for the ratio of the size of the model to the workpiece to be finished, a resistor having a plurality of sections mounted in the housing, control means operated by the lever system for varying the effective resistance of the resistor as a function of the movements of the probe with reference to the housing, means responsive to the velocity of the probe with reference to the housing for also altering the effective resistance of said resistor, and means responsive to said electrical control means for controlling the operation of said operating means to thus control the movement of said tool and tracer unit with reference to the workpiece and model workpiece, respectively.

9. In a system of control for a machine tool for operating on a workpiece, in combination, a model workpiece, a tool for operating on a workpiece to be finished, a mechanical coupling, a probe engaging the model but by said coupling mechanically coupled to the tool to move with the tool, said probe being positioned on the mechanical coupling to have some degree of movement with reference to the coupling, operating means for moving the tool, electric control means for controlling the movement of the tool and probe, said electric control means including, a lever system operated by the probe, a housing therefor, means for adjusting the relative lengths of the lever arms to compensate for the ratio of the size of the model to the workpiece to be finished, a resistor having a plurality of sections mounted in the housing, control means operated by the lever system for varying the effective resistance of the resistor as a function of the movements of the tracer probe relative to the housing, means responsive to the velocity and the rate of change in velocity of the probe with reference to the housing for also altering the effective resistance of said resistor, and means responsive to said control means for controlling the operation of said operating means to thus control the movement of said tool and tracer with reference to the workpiece and model workpiece respectively.

10. In a system of control for a machine tool for operating on a workpiece, in combination, a model workpiece, a tool for operating on a workpiece to be finished, a mechanical coupling, a probe engaging the model but by said coupling mechanically coupled to the tool to move with the tool, said probe being positioned on the mechanical coupling to have some degree of movement with reference to the coupling, operating means for moving the tool, electric control means for said operating means for controlling the movement of the tool and probe, said electric control means including, a lever system operated by the probe, a housing for the lever system, means for adjusting the relative lengths of the lever arms to compensate for the ratio of the size of the model to the workpiece to be finished, a resistor having a plurality of sections mounted in the housing, control means operated by the lever system for altering the effective resistance of the resistor as a function of the extent of the movements of the probe with reference to the housing, means responsive to the velocity of the probe with reference to the housing for also altering the effective resistance of said resistor, and means responsive to said control means for controlling the operation of said operating means to thus control the movement of said tool and tracer, and means responsive to an abnormal movement of the tracer relative to said housing for effecting the stopping of said machine tool.

11. In a system of control for a machine tool for operating on a workpiece, in combination, a model workpiece, a tool for operating on a workpiece to be finished, a mechanical coupling, a housing, a probe journaled on the housing engaging the model workpiece but by said coupling mechanically coupled to the tool to move with the tool, said probe being pivotally positioned on the mechanical coupling to have some degree of angular movement with reference to the coupling and the housing, operating means for moving the tool, electric control means for controlling the operating means to thus control the movement of the tool and housing, said electric control means including, a lever system operated by the probe, means for adjusting the relative lengths of the lever arms on the housing to compensate for the ratio of the size of the model workpiece to the workpiece to be finished, a resistor having a plurality of sections mounted in the housing, control means operated by the lever system for varying the effective resistance of the resistor as a function of the extent of angular movements of the tracer probe with reference to the housing, means responsive to the angular velocity and the rate of change in angular velocity of the probe with reference to the housing for altering the effective resistance of said resistor, means responsive to said control means for affecting the operation of said operating means for said tool and housing, and means responsive to an abnormal angular movement of the probe relative to said housing for effecting the stopping of said machine tool.

12. In a system of control for a machine for automatically shaping a propeller, in combination, a main reversible motor for angularly reciprocating the propeller, a generator connected to energize the armature of said motor, a source of direct current for exciting the generator, propeller forming means, a forming motor operating the propeller forming means, a saddle motor for positioning the forming means relative to the propeller, a pattern coupled to the reversible motor for angular reciprocation of the pattern, a tracer probe movably mounted on a base coupled to the saddle motor, said probe engaging the pattern and normally having a zero position, that is, a neutral position with reference to its base engaging the pattern, control means responsive to the departure of the probe from its neutral position, to the rate of change of the departure of the tracer probe from its neutral position, and to the speed of the saddle motor, energizing means for the saddle motor, said control means, through the energizing means for the saddle motor, controlling the position of the forming means on the propeller to correspond in position on the propeller to the zero, or neutral, position of the tracer probe on the pattern.

13. In a system of control for a machine for automatically shaping a propeller, in combination, a main reversible motor for angularly reciprocating the propeller, a generator connected to energize the armature of said motor, a source of direct current for exciting the generator, propeller forming means, a forming motor operating the propeller forming means, a saddle motor for positioning the forming means relative to the propeller, a pattern coupled to the reversible motor for angular reciprocation of the pattern, a tracer probe movably mounted on a base coupled to the saddle motor, said probe engaging the pattern and normally having a zero position, that is, a neutral position with reference to its base engaging the pattern, control means responsive to the departure of the probe from its neutral position, to the rate of change of the departure of the tracer probe from its neutral position, to the speed of the saddle motor, and to the rate of change of speed of the saddle motor, energizing means for the saddle motor, said control means, through the energizing means for the saddle motor, controlling the position of the forming means on the propeller to correspond in position on the propeller to the zero, or neutral, position of the tracer probe on the pattern.

14. In a system of control for a machine for automatically shaping a propeller, in combination, a main reversible motor for angularly reciprocating the propeller, a generator connected to energize the armature of said motor, a source of direct current for exciting the generator, propeller forming means, a forming motor operating the propeller forming means, a saddle motor for positioning the forming means relative to the propeller, a pattern coupled to the reversible motor for angular reciprocation of the pattern, a tracer probe movably mounted on a base coupled to the saddle motor, said probe engaging the pattern and normally having a zero position, that is, a neutral position with reference to its base engaging the pattern, control means responsive to the departure of the probe from its neutral position, to the rate of change of the departure of the tracer probe from its neutral position, and to the speed of the saddle motor, energizing means for the saddle motor, said control means, through the energizing means for the saddle motor, controlling the position of the forming means on the propeller to correspond in position on the propeller to the zero, or neutral, position of the tracer probe on the pattern, and means responsive to the said control means for modifying the excitation of the said generator.

15. In a system of control for a machine for automatically shaping a propeller, in combination, a main reversible motor for angularly reciprocating the propeller, a generator connected to energize the armature of said motor, a source of direct current for exciting the generator, propeller forming means, a forming motor operating the propeller forming means, a saddle motor for positioning the forming means relative to the propeller, a pattern coupled to operate with the main reversible motor, a tracer probe normally having a zero position with reference to its base, engaging the pattern, control means responsive to the departure of the probe from its neutral position, to the rate of change of the departure of the tracer probe from its neutral position, to the speed of the saddle motor, and to the rate of change of speed of the saddle motor, energizing means for the saddle motor, said control means through the energizing means controlling the position of the forming means on the propeller to correspond in position on the propeller to the zero, or neutral, position of the tracer probe on the pattern, and means responsive to the said control means for modifying the excitation of the said generator.

16. In a position regulating system for a machine tool, in combination, a tool, means for moving said tool on a workpiece, a pattern, a tracer unit coacting with said pattern for controlling the movement of the tool, said tracer unit including variable resistance means, anticipating means connected in parallel with said variable resistance means, said anticipating means comprising an adjustable resistor, and a resistor and capacitor connected in parallel with each other and connected in series with said adjustable resistor, electronic amplifying means, and means responsive to the potential across said adjustable resistor, the rate of change of the potential across said adjustable resistor, and the velocity of movement of said tool for controlling the operation of said electronic amplifying means, and means responsive to the operation of said electronic amplifying means for varying the operation of the means for moving said tool.

17. In a position regulating system for a machine tool, in combination, a tool, means for moving said tool on a workpiece, a pattern, a tracer unit coacting with said pattern for controlling the movement of the tool, said tracer unit including variable resistance means, anticipating means connected in parallel with said variable resistance means, said anticipating means comprising an adjustable resistor, and a resistor and capacitor connected in parallel with each other and connected in series with said adjustable resistor, electronic amplifying means, and means responsive to the potential across said adjustable resistor, the rate of change of the potential across said adjustable resistor, the velocity of movement of said tool and the rate of change of velocity of said tool for controlling the operation of said electronic amplifying means, and means responsive to the operation of said electronic amplifying means for varying the operation of the means for moving said tool.

18. A machine tool tracer regulator comprising a tool, means for feeding said tool, a template, and means coacting with the template for controlling the means for moving the tool, said last-named means including a resistor having multiple flexible shunt contacts for progressively shunting portions of said resistor, a tracer unit operatively coupled to the tool to move as a function of the tool movements, said tracer unit including lever means between said contacts and template for selectively opening and closing said contacts in accordance with magnitude and direction of displacement of the lever means with reference to the tracer unit while coacting with the contour of said template, means responsive to the rate of change of displacement of said lever means with reference to the tracer unit for modifying the operation of the means for moving the tool, and means responsive to the velocity of movement of the tracer unit for also modifying the operation of the means for moving the tool.

19. A machine tool tracer regulator comprising a tool, means for feeding said tool, a template, and means coacting with the template for controlling the means for moving the tool, said last-named means including a resistor having multiple flexible shunt contacts for progressively shunting portions of said resistor, a tracer unit operatively coupled to the tool to move as a function of the tool movements, said tracer unit including lever means between said contacts and template for selectively opening and closing said contacts in accordance with magnitude and direction of displacement of the lever means with reference to the tracer unit while coacting with the contour of said template, means responsive to the rate of change of displacement of said lever means with reference to the tracer unit for modifying the operation of the means for moving the tool, means responsive to the velocity of movement of the tracer unit for modifying the operation of the means for moving the tool, and means responsive to the rate of change of the velocity of movement of the tracer unit for also modifying the operation of the means for moving the tool.

20. The subject matter of claim 18, in combination, said tracer unit comprising a housing, a lever pivoted intermediate its ends at one end of the housing so that one free end of the lever extends into the housing and the other end projects from the housing, a probe on the end projecting from the housing, a second lever extending in the same general direction as the first lever disposed within the housing and pivoted near one of its ends within the housing, a tension spring connected to the first lever at the free end disposed in the housing and connected to the second lever so as to urge the levers toward one another, and an adjustable contact mounted on one of the levers and contacting the other lever whereby any selected proportionate movements of the second lever may be effected by the movements of the first lever effected by tracing action of the probe on the pattern.

21. The subject matter of claim 18 in combination, said tracer unit comprising a housing, a lever pivoted intermediate its ends at one end of the housing so that one free end of the lever extends into the housing and the other end projects from the housing, a probe on the end projecting from the housing, said probe having the same general form as the tool for shaping the workpiece, a second lever extending in the same general direction as the first lever disposed within the housing and pivoted near one of its ends within the housing, a tension spring connected to the first lever at the free end disposed in the housing and connected to the second lever so as to urge the levers toward one another, and an adjustable contact mounted on one of the levers and contacting the other lever whereby any selected proportionate movements of the second lever may be effected by the movements of the first lever effected by tracing action of the probe on the pattern.

22. The subject matter of claim 16 in combination, said tracer unit comprising a housing, a lever pivoted intermediate its ends at one end of the housing so that one free end of the lever extends into the housing and the other end projects from the housing, a probe on the end projecting from the housing, a second lever extending in the same general direction as the first lever disposed within the housing and pivoted near one of its ends within the housing, a tension spring connected to the first lever at the free end disposed in the housing and connected to the second lever so as to urge the levers toward one another, and an adjustable contact mounted on one of the levers and contacting the other lever whereby any selected proportionate movements of the second lever may be effected by the movements of the first lever effected by tracing action of the probe on the pattern, said variable resistance means comprising a plurality of resistor sections mounted in the housing of the tracer unit, a plurality of resilient resistor section shunting contacts mounted in the housing, and means at the free end of the second lever for moving said resilient contacts to shunt more or fewer resistor sections depending on the direction of movement of the free end of the second lever.

23. In a tracer unit for the control of an electric motor operating a machine tool to reproduce a workpiece in accordance with the contour of a pattern, the subcombination, an elongated housing, a lever pivoted intermediate its ends at one end of the housing so that one free end extends longitudinally of the housing within the housing and the other end projects from the housing, a probe for engaging a pattern on the said other end of the housing, a second lever disposed within the housing in substantially parallel relation to the said one free end of the first lever, said second lever being pivoted, near one of its ends, within the housing at a point beyond the said one free end of the first lever, resilient means disposed in the housing for biasing the levers toward each other, a shiftable stop disposed on one lever engaging the other lever to thus transmit any selected proportion of the movement of the probe to the second lever, and means operable by the movement of the second lever for controlling the operation of the machine tool.

24. In a tracer unit for the control of an electric motor operating a machine tool to reproduce a workpiece in accordance with the contour of a pattern, the subcombination, an elongated housing, a lever pivoted intermediate its ends at one end of the housing so that one free end extends longitudinally of the housing within the housing and the other end projects from the housing, a probe for engaging a pattern on the said other end of the housing, a second lever disposed within the housing in substantially parallel relation to the said one free end of the first lever, said second lever being pivoted, near one of its ends, within the housing at a point beyond the said one free end of the first lever, resilient means disposed in the housing for biasing the levers toward each other, a shiftable stop disposed on one lever engaging the other lever to thus transmit any selected proportion of the movement of the probe to the second lever, a plurality of resistor sections connected in series disposed in the housing, a plurality of resilient spaced contact strips connected at corresponding ends to taps between the resistor sections, and means on the free end of the second lever for deflecting the strip to make contact with each other to thus shunt any selected number of resistor sections.

CLINTON R. HANNA.
WILLIAM O. OSBON.